United States Patent [19]
Norton

[11] 3,861,645
[45] Jan. 21, 1975

[54] VALVED COUPLING WITH SLIDABLE SEAL RING

[75] Inventor: James F. Norton, Berea, Ohio

[73] Assignee: The Hansen Manufacturing Co., Cleveland, Ohio

[22] Filed: Apr. 27, 1973

[21] Appl. No.: 355,183

Related U.S. Application Data

[63] Continuation of Ser. No. 286,764, Sept. 6, 1972, abandoned.

[52] U.S. Cl. ............................................. 251/149.6
[51] Int. Cl. .............................................. F16l 37/28
[58] Field of Search.............. 251/149, 149.1, 149.6, 251/149.8, 149.9, 149.7; 137/614.03, 614.04

[56] References Cited
UNITED STATES PATENTS

| | | | |
|---|---|---|---|
| 2,322,877 | 6/1943 | Parker | 251/149.6 |
| 2,377,812 | 6/1945 | Scheiwer | 251/149.6 X |
| 2,536,702 | 1/1951 | Scheiwer | 251/149.7 |
| 2,689,138 | 9/1954 | Scheiwer | 137/614.03 |
| 3,052,261 | 9/1962 | Nyberg | 251/149.6 X |

FOREIGN PATENTS OR APPLICATIONS

| | | | |
|---|---|---|---|
| 466,643 | 6/1937 | Great Britain | 251/149.6 |

Primary Examiner—William R. Cline

[57] ABSTRACT

An improved socket assembly receives a plug element to connect a pair of conduits in fluid communication. The socket assembly includes a valve member which is movable between open and closed conditions and is biased toward the closed condition by a valve spring. When the valve member is in the closed condition, a seal ring blocks fluid flow through ports in the valve member. The seal ring and valve member are movable axially together under the influence of the plug element from a first position to a second position with the valve member in the open condition as the plug element is inserted into the socket assembly. A seal spring urges the seal ring toward the first position. When the valve member is in the open position, the ports in the valve member direct fluid flow along a path which extends axially through the seal and valve springs and does not extend through adjacent coils of these springs.

15 Claims, 4 Drawing Figures

3,861,645

VALVED COUPLING WITH SLIDABLE SEAL RING

This is a continuation of application Ser. No. 286,764, filed Sept. 6, 1972 now abandoned.

BACKGROUND AND SUMMARY OF THE PRESENT INVENTION

The present invention relates to a new and improved socket assembly and more specifically to a socket assembly having a valve member which is operated from a closed condition to an open condition when a plug element is inserted into the socket assembly.

There are many known couplings having internal valve members. For example U.S. Pat. No. 2,322,877 to Parker discloses a coupling having an internal valve member which is biased toward a closed position by a valve spring and is moved away from a fixed seal by a plug element as the plug element is inserted into the coupling. A somewhat similar coupling is disclosed in U.S. Pat. No. 2,377,812 to Scheiwer which shows an internal valve member having a plurality of ports or holes on opposite sides of a transverse flow blocking wall. The valve member of Scheiwer is moved away from a fixed seal by a plug element to open the valve member as the plug element is inserted into the coupling. Fluid flow through the open valve member of Scheiwer is somewhat restricted due to the position of coils or turns of a valve biasing spring around ports in the valve member. In addition, it should be noted that either of these patents provides a seal which moves with the open valve member to guide movement of the valve member and to maintain a predetermined positional relationship between the valve member and seal after the valve member has been opened.

The present invention provides a new and improved socket assembly having an internal valve member which is moved to an open condition as a plug element is inserted into the socket assembly. Once the valve member has opened, the plug element is effective to move the open valve member and a seal member together relative to the socket body. To facilitate fluid flow through the socket assembly once the valve member has opened, ports are provided in the valve member to direct fluid flow along a path which extends axially along biasing springs for the valve and seal members so that fluid does not have to flow between coils of the springs.

Accordingly, it is an object of this invention to provide a new and improved socket assembly having seal and valve members which are moved axially together under the influence of a plug element with the valve member in an open position as the plug element is inserted into the socket assembly.

Another object of this invention is to provide a new and improved socket assembly having a valve element and seal which are biased to predetermined positions by a pair of coil springs disposed in a coaxial relationship with each other and wherein the valve member directs fluid flow along a path extending through the springs without passing between adjacent coils of the springs.

BRIEF DESCRIPTION OF THE DRAWINGS.

The foregoing and other objects and features of the present invention will become more apparent upon a consideration of the following description taken in connection with the accompanying drawings wherein.

DESCRIPTION OF ONE PREFERRED EMBODIMENT OF THE INVENTION

Figure 1:
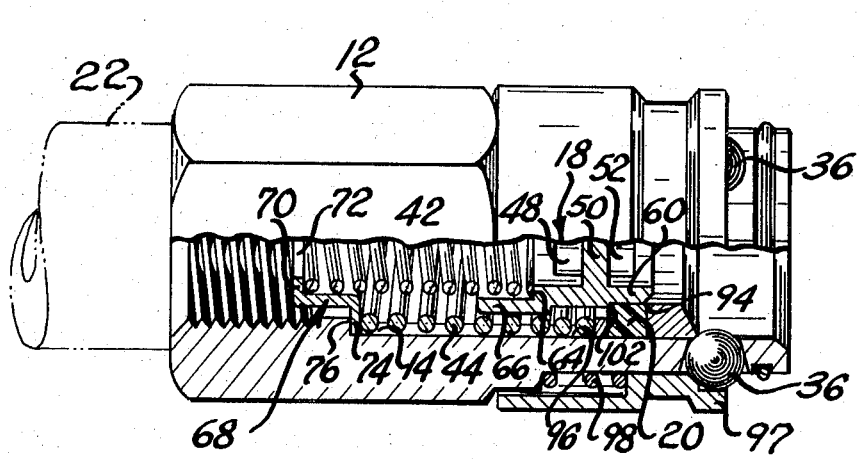
FIG. 1 is a partially broken away view of a socket assembly constructed in accordance with the present invention.

A socket assembly 10 constructed in accordance with the present invention includes the body 12 defining a cylindrical valve chamber 14 in which an internal valve member 18 engages an annular seal ring or washer 20 to block fluid flow from a conduit 22. When a plug element 26 (see FIG. 2) is inserted into the socket assembly 12, a cylindrical nose portion 28 of the plug element moves into sealing engagement with the seal ring 20. Thereafter, the nose portion 28 moves the valve member 18 out of sealing enegagement with the seal ring 20 to enable air or other fluid to flow from the conduit 22 through the socket assembly 10 to a conduit 30 along a path indicated by the elongated dashed line 32 in FIG. 2. After the valve member 18 has been moved to the open position, continued inward movement of the plug element 26 moves the seal ring 20 and valve member axially inwardly together until retaining or latching balls 36 engage an annular recess 40 in the plug element 26 to retain the plug element against axially inward movement relative to the socket assembly 10.

Once the plug element 26 has been inserted into the socket assembly 10, air or other fluid from the conduit 22 flows through the socket assembly 10 and plug 26 to the conduit 30 without passing between adjacent coils of a valve biasing spring 42 and a seal biasing spring 44. Thus, the air or other fluid flows from the conduit 22 along the center axis of the valve spring 42 to a port 48 formed in the valve member 18. The air or other fluid then flows through the port 48, around a transverse blocking wall or section 50, and back into the valve member 18 through a port 52. The air or other fluid flows from the valve member 18 through the plug element 26 into the conduit 30.

When the coupling assembly 10 is in the disconnected condition of FIG. 1, fluid flow from the conduit 22 through the coupling assembly is blocked by cooperation of the valve member 18 with the seal ring 20. The seal ring 20 has an annular inner surface which is disposed in a sealing engagement with an annular outer wall 60 of the closed valve member 18. The seal ring 20 blocks fluid flow through the port 52 of the closed valve member 18.

The valve member 18 is urged to the closed condition by the valve spring 42 which extends between a circular shoulder 64 formed on the inside of an annular inner wall 66 of the valve member 18 and a retaining cap or insert 68. The cap or insert 68 has an annular inwardly projecting lip 70 which defines a circular fluid passage 72 and is engaged by the outer end of the valve spring 42. An annular outward projecting lip 74 engages a shoulder formed in the socket body 12 to hold the cap 68 against axial movement so that the valve spring 42 is trapped between the valve member 18 and the retaining cap. Thus, the valve member 18 is maintained in the closed position by the coil spring 42 to block fluid flow through the socket assembly 10 when the socket assembly is in the disconnected condition of FIG. 1.

As the plug element 26 is inserted into the socket assembly 10, an annular leading surface on the nose portion 28 of the plug element is moved into abutting engagement with the annular outer wall 60 of the closed valve member 18. Further inward movement of the plug element 26 moves the valve member 18 inwardly, against the influence of the valve spring 42. As the valve member 18 begins to move inwardly, the seal ring 20 sealingly engages the plug element 26. The port 52 is then moved away from the seal ring 20 until the valve member 18 is in the fully opened position. When the valve member 18 is fully open, the ring 20 sealingly engages the outside of the plug element 26 and is disposed downstream of the port 52. The air or other fluid can then flow through the port and into the plug element in the manner illustrated in FIG. 3.

Once the valve member 18 has fully opened, a radially projecting shoulder 80 on the plug element 26 moves into abutting engagement with an axially outer surface 84 of a ball retaining ring 86. An axially outer surface 88 of the seal ring 20 is pressed against an axially inner surface 90 of the ball retaining ring 86 by the seal spring 44. Continued inward movement of the plug element 26 causes the shoulder 80 on the plug element to move the ball retaining ring 86 inwardly.

This inward movement of the ball retaining ring 86 presses the seal ring 20 inwardly against the influence of the biasing spring 44. As the seal ring 20 is moved inwardly by the plug element 26, the valve member 18 is also moves inwardly by the nose portion 28 of the plug element. Therefore, the seal ring 20 and valve member 18 move inwardly together with the valve member in the open condition illustrated in FIG. 2. This inward movement of the seal ring 20 and valve member 18 is guided by sliding engagement of an annular outer surface 94 of the seal ring with a cylindrical inner surface 96 of the valve chamber 14.

Figure 2:
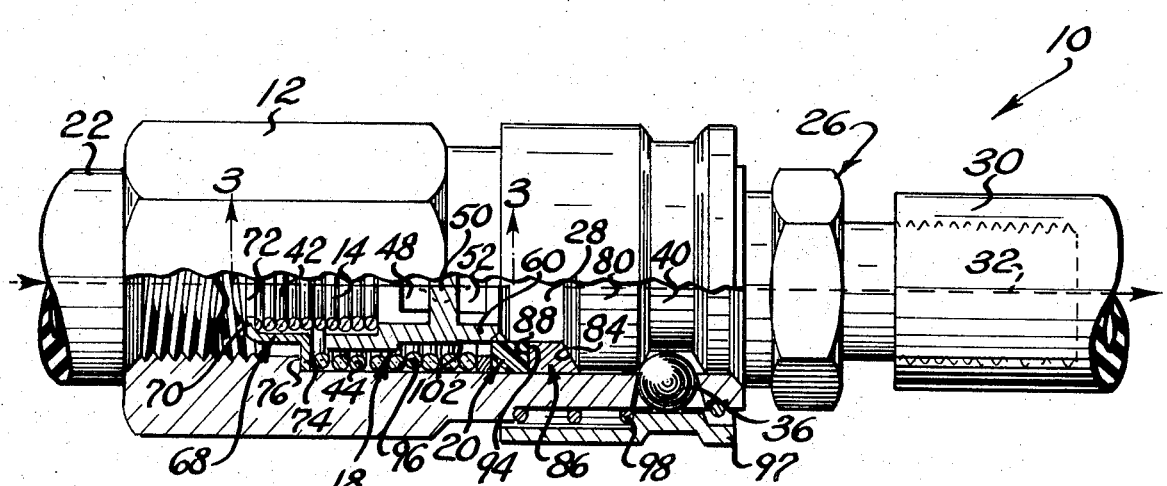
FIG. 2 is a partially broken away view, similar to FIG. 1, illustrating the socket assembly of FIG. 1 in association with a plug element.

When the plug element 26 reaches the fully inserted position of FIG. 2, the retaining balls 36 move into the annular groove 40 and a locking sleeve 97 is moved axially outwardly by a sleeve spring 98 to releasably lock or latch the plug element 26 in the socket assembly 10 in a known manner. When the plug element 26 is locked in place by the retaining balls 36, the retaining ring 86 holds the seal ring 20 inwardly against the influence of the compressed seal spring 44. In addition, the nose portion of the plug element 28 holds the valve member 18 fully open against the influence of the compressed valve spring 42.

Figure 3:
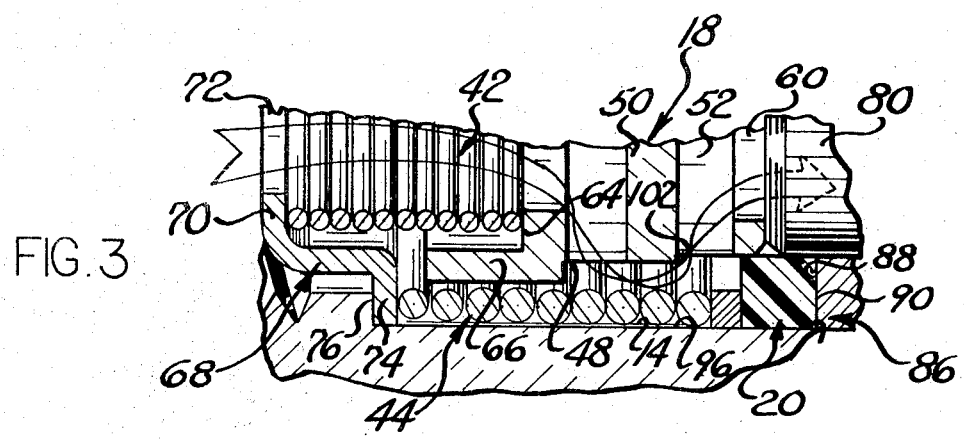
FIG. 3 is an enlarged sectional view, taken generally along the line 3—3 of FIG. 2, illustrating the path of fluid flow through the socket assembly.

When the valve spring 42 and seal spring 44 are in the compressed condition of FIGS. 2 and 3, adjacent circular turns of these coil springs are either disposed in abutting engagement or are very close to each other. If the path of fluid flow is directed between the adjacent coils of either one of these two springs, fluid flow through the socket assembly 10 would be impeded. However, the valve ports 48 and 52 direct the fluid flow along a path which does not extend between adjacent turns or coils of the springs 42 and 44 so that air or other fluid can flow freely through the socket assembly 10.

When the socket assembly 10 and plug element 26 are interconnected as shown in FIG. 2, fluid under pressure can flow axially through a cylindrical center passage formed in the valve spring 42 to the port 48 in the valve member 18. The fluid then flows along the inside of the coil spring 44 and around the generally circular blocking wall or section 50 (see FIG. 3) to the port 52. The fluid then flows through the port 52 and flows out of the valve member 18 to the plug element 26 through a circular opening defined by the annular wall 60. The sealring 20 sealingly engages the plug element 26 to prevent fluid leakage from the coupling.

The cylindrical valve and seal springs 42 and 44 are disposed in a coaxial telescopic relationship with the valve spring inwardly of the seal ring. The outer end of the valve spring 42 is disposed in a circular cavity defined by the annular wall 66 and terminates upstream of the port 48. Therefore, fluid flowing under pressure can flow from the conduit 22 axially through the center of the valve spring 42, around the end of the valve spring, and through the port 48 without passing between adjacent coils or turns of the valve spring (see FIG. 3).

The seal spring 44 circumscribes a portion of both the valve member 18 and the valve spring 42. Due to the relatively large inside diameter of the seal spring 44, fluid can flow transversely or radially outwardly through the port 48 into the area between the valve member 18 and the coils of the seal spring 44 without passing between the coils of the seal spring. The fluid then flows back inwardly through the port 52 in the wall 60 of the valve member 18 and through the relatively large opening provided by the annular wall 60 to the plug element 26. Thus, even though the valve spring 42 and seal spring 44 are disposed in a telescopic relationship with each other, the air or other fluid can flow through the valve spring 42 and outwardly of the valve spring through the port 48 toward the coils of the seal spring without passing through the coils of the valve spring. The air or other fluid can then flow back through the port 52 without passing through the coils of the seal spring 44. Therefore, fluid flow through the open socket assembly 10 is not impeded by the necessity of flowing between adjacent turns or coils of either the valve spring 42 or seal spring 44.

When the plug element 26 is to be disconnected from the socket assembly 10, the latch slide or sleeve 97 is moved axially inwardly (that is toward the left as viewed in FIG. 2) to release the latch balls 36 for movement of the annular groove 40 in the plug element 26. This releases the plug element 26 for movement out of the socket assembly 10. During initial outward movement of the plug element 26, the seal ring 20 and valve member 18 move outwardly together with the valve member in the open position of FIG. 2. However, when the leading or outer end portion of the retainer ring 86 moves into engagement with the latch balls 36 (as shown in FIG. 1) the outward movement of the retaining ring 86 and seal ring 20 is stopped.

Continued withdrawal of the plug element 26 results in the nose portion 28 of the plug element being moved axially outwardly of the seal ring 20 and the valve member 18 moving into increasing engagement with the interior surface of the seal ring 20. When the valve member 18 is closed, a shoulder 102 on the valve member 18 moves into abutting engagement with the seal ring 20. At this time the seal ring 20 blocks the port 52 and the flow of fluid through the socket assembly 10. Continued outward movement of the plug element 26 completely disconnects the plug element from the socket assembly 10.

Figure 4:
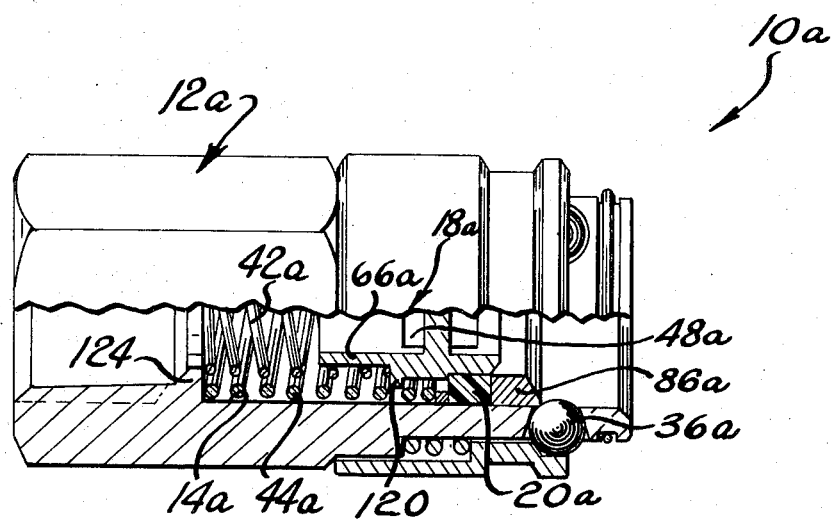
FIG. 4 is a partially broken away view of a second embodiment of the socket assembly.

The embodiment of the invention illustrated in FIG. 4 is generally similar to the embodiment of the invention illustrated in FIGS. 1-3. Therefore, the elements of the socket assembly illustrated in FIG. 4 will be identified by the same numerals as the corresponding elements of the socket assembly of FIGS. 1-3. Generally speaking, the embodiment of the invention illustrated in FIG. 4 differs from the embodiment illustrated in FIGS. 1-3 in that the valve spring is disposed in a telescopic relationship with the outside of the valve member and in that the retaining cap or insert 68 has been replaced by an annular spring seat which is integrally formed with the body of the socket assembly. To avoid confusion, the suffix letter "a" will be added to the numerals associated with the embodiment of the invention disclosed in FIG. 4.

The socket assembly 10a includes a body 12a defining a cylindrical valve chamber 14a in which an internal valve member 18a engages an annular seal ring or washer 20a to block fluid flow when the socket assembly is in the disconnected condition of FIG. 4. The seal ring 20a and a retaining ring 86a are urged axially outwardly by a seal biasing spring 44a in the manner explained in conjunction with the socket assembly illustrated in FIGS. 1-3. In addition, the valve member 18a is urged into sealing engagement with the seal ring 20a by a valve spring 42a. It should be noted that the valve spring 42a extends along the outside of an annular wall 66a of the valve member 18a rather than being disposed inside of the wall, as in the embodiment of the invention shown in FIGS. 1-3. The valve spring 42a engages an annular spring seat 120 which is integrally formed with the valve wall 66a at a location inwardly or upstream of a port 48a.

The valve spring 42a and seal spring 44a both engage an annular seat 124 which is integrally formed with the body 12a of the socket assembly. In forming the spring seal 124 integrally with the body 12a of the socket assembly, it is possible to avoid fabrication expenses which are associated with the manufacture of the retaining cap or insert of the embodiment of the invention illustrated in FIGS. 1-3. However it should be understood that although the retaining cap 68 has been eliminated, the valve spring 42a and seal spring 44a interact with the valve member 18a and the seal ring 20a in the same manner as previously explained in connection with the embodiment of the invention illustrated in FIGS. 1-3. It is contemplated that under certain circumstances the embodiment of the invention illustrated in FIG. 4 will be be preferred since it has fewer components and may be less expensive to manufacture.

in view of the foregoing description, it can be seen that the socket assembly 10 includes a valve member 18 which is disposed within a cylindrical valve chamber 14 and is movable between a closed condition in which the seal ring 20 blocks fluid flow through the port 52 and an open condition which fluid can flow through the port 52. The valve member 18 and seal member 20 are urged axially outwardly by a pair of telescopically disposed coil springs 42 and 44.

When the plug element 26 is inserted into the socket assembly 10, the valve member 18 is first moved to the open position shown in FIG. 2. Continued insertion of the plug element 26 moves the open valve member 18 and the seal ring 20 inwardly together. During this inward movement, the interior wall 96 of the valve chamber 14 guides the movement of the seal ring 20 and valve member 18.

When the plug element 26 has been inserted into the socket assembly 10, fluid can flow through a central passage defined by the coils of the valve spring 42, past the end of the valve spring, through the port 48, and radially outwardly of the coils of the valve spring toward the coils of the seal spring 44. The fluid then flows around the blocking wall 50 and then back inwardly through the port 52 without passing through the coils of either the valve spring 42 or seal spring 44. Although the air or other fluid has been described herein as flowing from the conduit 22 through the socket assembly 10 and the plug element 26 to the conduit 30, it should be understood that under certain circumstances the fluid may flow from the conduit 30 through the plug element 26 and socket assembly 10 to the conduit 22.

Having described a specific preferred embodiment of the invention, the following is claimed:

1. A socket assembly for receiving a plug element to connect a conduit associated with said socket assembly in fluid communication with a conduit associated with the plug element, said socket assembly comprising a socket body adapted to be connected with a conduit and defining a centrally disposed valve chamber, a valve member disposed in said valve chamber and movable between a closed condition and an open condition enabling fluid to flow through said valve chamber, first coil spring means disposed in said valve chamber for urging said valve member toward the closed condition, seal means disposed in said valve chamber for cooperating with said valve member to block fluid flow through the valve chamber when said valve member is in the closed condition and for sealingly engaging the plug element when said valve member is in the open condition, said seal means being movable axially relative to the socket body under the influence of the plug element from a first position to a second position as the plug element is received in the socket assembly, and second coil spring means disposed in said valve chamber in a telescopic relationship with said first coil spring means for urging said seal means to the first position, said valve member including port means for enabling fluid to flow along a path having a first portion which is disposed inwardly of the coils of said first and second coil spring means and a second portion which is disposed inwardly of the coils of said second coil spring means and outwardly of the coils of said first coil spring means without passing between adjacent coils of either of said coil spring means when said valve member is in the open condition.

2. A socket assembly as set forth in claim 1 wherein said valve member includes a transverse wall extending perpendicular to a longitudinal center axis of said first and second coil springs, a first annular wall extending inwardly from said transverse wall and having a central axis disposed in a coaxial relationship with the central axis of said first and second coil springs, said first annular wall being circumscribed by said second coil spring and defining a cavity for telescopically receiving one end portion of said first coil spring, first port means defined by said first annular wall between the one end portion of said first coil spring and said transverse wall for enabling fluid to flow along a path extending through said first annular wall and along the central axis of said first and second coil springs without passing between adjacent coils of said first and second coil springs, a second annular wall extending outwardly from said transverse wall and having a central axis disposed in a coaxial relationship with said seal ring and said first annular wall, second port means defined by said second annular wall for enabling fluid to flow along a path extending through said second annular wall, said second annular wall including surface means disposed in sliding engagement with an inner surface of said seal ring for guiding movement of said valve member between the closed condition in which said seal ring blocks fluid flow through said second port means and an open condition in which said seal ring is ineffective to block fluid flow through said second port means.

3. A socket assembly for receiving a plug element to connect a conduit associated with said socket assembly in fluid communication with a conduit associated with the plug element, said socket assembly comprising a socket body adapted to be connected with a conduit and defining a centrally disposed valve chamber, a valve member disposed in said valve chamber and movable between a closed condition and an open condition enabling fluid to flow through said valve chamber, seal means disposed in said valve chamber for cooperating with said valve member to block fluid flow through the valve chamber when said valve member is in the closed condition and for sealingly engaging the plug element when said valve member is in the open condition, said seal means being movable axially relative to the socket body under the influence of the plug element from a first position to a second position as the plug element is received in the socket assembly, and coil spring means disposed in said valve chamber for urging said seal means toward the first position and for urging said valve member toward the closed condition, said valve member including means for enabling fluid to flow along a path having a first portion which is disposed radially inwardly of the coils of said coil spring means and a second portion which is disposed radially outwardly of the coils of said coil spring means without passing between adjacent coils of said coil spring means when said valve member is in the open condition.

4. A socket assembly for receiving a plug element to connect a conduit associated with said socket assembly in fluid communication with a conduit associated with the plug element, said socket assembly comprising a socket body adapted to be connected with a conduit and defining an axially extending valve chamber, a valve member disposed in said valve chamber and movable axially relative to said socket body between a closed condition and an open condition enabling fluid to flow through said valve chamber, seal means disposed in said valve chamber for cooperating with said valve member to block fluid flow through the valve chamber when said valve member is in the closed condition and for sealingly engaging the plug element when said valve member is in the open condition, said seal means being movable axially relative to said socket body from a first position to a second position, spring means disposed in said valve chamber for urging said seal means to the first position, a plurality of locking elements connected with and movable relative to said socket body between a release condition and a holding condition in which said locking elements retain the plug element against axial movement relative to the socket body, retainer means movable axially relative to said socket body under the influence of the plug element from an engaged position in which said retainer means is effective to retain said locking elements in the release condition to a disengaged position in which said retainer means is ineffective to retain said locking elements in the release condition, said retainer means including means for effecting axial movement of said seal means from the first position to the second position as said retainer means is moved from the engaged position to the disengaged position, and means for guiding axial movement of said seal means from the first position to the second position under the influence of said retainer means and against the influence of said spring means as the plug element is received in the socket assembly and for guiding axial movement of said seal means and valve member from the second position to the first position under the influence of said spring means as the plug element is at least partially withdrawn from the socket assembly.

5. A socket assembly for receiving a plug element to connect a conduit associated with said socket assembly in fluid communication with a conduit associated with the plug element, said socket assembly comprising a socket body adapted to be connected with a conduit and defining a centrally disposed valve chamber, a valve member disposed in said valve chamber and movable between a closed condition and an open condition enabling fluid to flow through said valve chamber, seal means disposed in said valve chamber for cooperating with said valve member to block fluid flow through the valve chamber when said valve member is in the closed condition and for sealingly engaging the plug element when said valve member is in the open condition, said seal means and valve member being movable axially together relative to the socket body under the influence of the plug element from a first position to a second position with said valve member in the open condition as the plug element is received in the socket assembly, spring means disposed in said valve chamber for urging said seal means to the first position and for urging said valve member toward the closed condition, said spring means comprising a coil spring disposed in abutting engagement with said valve member, said valve member including means for enabling fluid to flow along a path which is disposed inwardly of the coils of said coil spring throughout the length of said coil spring, and means for guiding movement of said seal means and valve member from the first position to the second position with said valve member in the open condition and against the influence of said spring means as the plug element is received in the socket assembly and for guiding movement of said seal means and valve member from the second position to the first position with said valve member in the open condition and under the influence of said spring means as the plug element is at least partially withdrawn from said socket assembly.

6. A socket assembly for receiving a plug element to connect a conduit associated with said socket assembly in fluid communication with a conduit associated with the plug element, said socket assembly comprising a socket body adapted to be connected with a conduit and defining a centrally disposed valve chamber, a valve member disposed in said valve chamber and movable between a closed condition and an open condition enabling fluid to flow through said valve chamber, seal means disposed in said valve chamber for cooperating with said valve member to block fluid flow through the valve chamber when said valve member is in the closed condition and for sealingly engaging the plug element when said valve member is in the open condition, said seal means and valve member being movable axially together relative to the socket body under the influence of the plug element from a first position to a second position with said valve member in the open condition as the plug element is received in the socket assembly, spring means disposed in said valve chamber for urging said seal means to the first position and for urging said valve member toward the closed condition, said spring means including a first coil spring disposed in the valve chamber in engagement with said seal means and circumscribing at least a portion of said valve member and a second coil spring at least a portion of which is disposed inwardly of the coils of said first coil spring in engagement with said valve member, said valve member including port means for enabling fluid to flow along a path having a first portion which is disposed inwardly of the coils of said first and second coil springs and a second portion which is disposed inwardly of the coils of said first coil spring and outwardly of the coils of said second coil spring without passing between adjacent coils of either of said coil springs when said valve member is in the open condition, and means for guiding movement of said seal means and valve member from the first position to the second position with said valve member in the open condition and against the influence of said spring means as the plug element is received in the socket assembly and for guiding movement of said seal means and valve member from the second position to the first position with said valve member in the open condition and under the influence of said spring means as the plug element is at least partially withdrawn from said socket assembly.

7. A socket assembly for receiving a plug element to connect a conduit associated with said socket assembly in fluid communication with a conduit associated with the plug element, said socket assembly comprising a socket body adapted to be connected with a conduit and defining a centrally disposed valve chamber, a valve member disposed in said valve chamber and movable between a closed condition and an open condition enabling fluid to flow through said valve chamber, seal means disposed in said valve chamber for cooperating with said valve member to block fluid flow through the valve chamber when said valve member is in the closed condition and for sealingly engaging the plug element when said valve member is in the open condition, said seal means and valve member being movable axially together relative to the socket body under the influence of the plug element from a first position to a second position with said valve member in the open condition as the plug element is received in the socket assembly, spring means disposed in said valve chamber for urging said seal means to the first position and for urging said valve member toward the closed condition, means for guiding movement of said seal means and valve member from the first position to the second position with said valve member in the open condition and against the influence of said spring means as the plug element is received in the socket assembly and for guiding movement of said seal means and valve member from the second position to the first position with said valve member in the open condition and under the influence of said spring means as the plug element is at least partially withdrawn from said socket assembly, a plurality of locking elements connected with and movable relative to said socket body between a release condition and holding condition in which said locking elements retain the plug element against axial movement relative to the socket body, and retainer means movable relative to said socket body under the influence of the plug element from an engaged position in which said retainer means is effective to retain said locking elements in the release condition to a disengaged position in which said retainer means is ineffective to retain said locking elements in the release condition, said retainer means including means for effecting movement of said seal means and valve member from the first position to the second position with said valve member in the open condition as said retainer means is moved from the engaged position to the disengaged position.

8. A socket assembly as set forth in claim 7 wherein said spring means is effective to move said retainer means from the disengaged condition to the engaged condition as the plug element is withdrawn from said socket assembly.

9. A socket assembly for receiving a plug element to connect a conduit associated with said socket assembly in fluid communication with a conduit associated with the plug element, said socket assembly comprising a socket body adapted to be connected with a conduit and defining a centrally disposed valve chamber, a valve member disposed in said valve chamber and movable between a closed condition and an open condition enabling fluid to flow through said valve chamber, seal means disposed in said valve chamber for cooperating with said valve member to block fluid flow through the valve chamber when said valve member is in the closed condition and for sealingly engaging the plug element when said valve member is in the open condition, said seal means and valve member being movable axially together relative to the socket body under the influence of the plug element from a first position to a second position with said valve member in the open condition as the plug element is received in the socket assembly, said seal means including an annular seal ring, spring means disposed in said valve chamber for urging said seal means to the first position and for urging said valve member toward the closed condition, said spring means including a coil spring disposed in a coaxial relationship witn said seal ring, and means for guiding movement of said seal means and valve member from the first position to the second position with said valve member in the open condition and against the influence of said spring means as the plug element is received in the socket assembly and for guiding movement of said seal means and valve member from the second position to the first position with said valve member in the open condition and under the influence of said spring means as the plug element is at least partially withdrawn from said socket assembly, said valve member including a transverse wall extending perpendicular to a longitudinal central axis of said coil spring, a first annular wall extending inwardly from said transverse wall and having a central axis disposed in a coaxial relationship with the central axis of said coil spring, said first annular wall defining a cavity for telescopically receiving one end portion of said coil spring, first port means defined by said first annular wall between the one end portion of said coil spring and said transverse wall for enabling fluid to flow along a path extending through said first annular wall and along the central axis of said coil spring without passing between adjacent coils of said coil spring, a second annular wall extending outwardly from said transverse wall and having a central axis disposed in a coaxial relationship with said seal ring and said first annular wall, second port means defined by said second annular wall for enabling fluid to flow along a path extending through said second annular wall, said second annular wall including surface means disposed in sliding engagement with an inner surface of said seal ring for guiding movement of said valve member between the closed condition in which said seal ring blocks fluid flow through said second port means and an open condition in which said seal ring is ineffective to block fluid flow through said second port means.

10. A socket assembly as set forth in claim 4 wherein said spring means comprises a coil spring disposed in abutting engagement with said valve member.

11. A socket assembly as set forth in claim 4 wherein said spring means includes a first coil spring disposed in the valve chamber in engagement with said seal means and circumscribing at least a portion of said valve member and a second coil spring at least a portion of which is disposed inwardly of the coils of said first coil spring in engagement with said valve member, said valve member including port means for engabling fluid to flow along a path having a first portion which is disposed inwardly of the coils of said first and second coil springs and a second portion which is disposed inwardly of the coils of said first coil spring and outwardly of the coils of said second coil spring without passing between adjacent coils of either of said coil springs when said valve member is in the open condition.

12. A socket assembly as set forth in claim 4 wherein said means for guiding movement of said seal means and valve member includes an interior surface of said socket body which is slidably engaged by said seal means.

13. A socket assembly as set forth in claim 4 wherein said seal means includes surface means for engaging said valve member as said valve member moves between the open and closed conditions to guide movement of said valve member between said open and closed conditions.

14. A socket assembly for receiving a plug element to connect a conduit associated with said socket assembly in fluid communication with a conduit associated with the plug element, said socket assembly comprising a socket body adapted to be connected with a conduit and defining a centrally disposed valve chamber, a valve member disposed in said valve chamber and movable between a closed condition and an open condition enabling fluid to flow through said valve chamber, seal means disposed in said valve chamber for cooperating with said valve member to block fluid flow through the valve chamber when said valve member is in the closed condition and for sealingly engaging the plug element when said valve member is in the open condition, said seal means and valve member being movable axially together relative to the socket body under the influence of the plug element from a first position to a second position with said valve member in the open condition as the plug element is received in the socket assembly, said seal means including surface means for engaging said valve member as said valve member moves between the open and closed conditions to guide movement of said valve member between said open and closed conditions, spring means disposed in said valve chamber for urging said seal means to the first position and for urging said valve member toward the closed condition, and means for guiding movement of said seal means and valve member form the first position to the second position with said valve member in the open condition engaging said seal means and against the influence of said spring means as the plug element is received in the socket assembly and for guiding movement of said seal means and valve member from the second position to the first position with said valve member in the open condition engaging said seal means and under the influence of said spring means as the plug element is at least partially withdrawn from said socket assembly.

15. A socket assembly as set forth in claim 14 wherein said means for guiding movement of said seal means and valve member includes an interior surface of said socket body which is slidably engaged by said seal means.

* * * * *